United States Patent
Jung et al.

(10) Patent No.: US 8,725,324 B2
(45) Date of Patent: May 13, 2014

(54) LOAD COMPENSATING DEVICE IN RAILWAY VEHICLES

(71) Applicant: LSIS Co., Ltd., Anyang-si (KR)

(72) Inventors: Jong Chul Jung, Seoul (KR); Yong Gee Cho, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/856,397

(22) Filed: Apr. 3, 2013

(65) Prior Publication Data
US 2013/0274966 A1  Oct. 17, 2013

(30) Foreign Application Priority Data
Apr. 13, 2012 (KR) .................. 10-2012-0038601

(51) Int. Cl.
*B60T 8/18* (2006.01)
*G01M 17/08* (2006.01)
*B60T 8/17* (2006.01)

(52) U.S. Cl.
CPC .............. *B60T 8/1705* (2013.01); *G01M 17/08* (2013.01); *B60T 8/1893* (2013.01)
USPC ........................................... 701/19

(58) Field of Classification Search
None
See application file for complete search history.

(56) References Cited

U.S. PATENT DOCUMENTS

| | | | |
|---|---|---|---|
| 4,538,228 A * | 8/1985 | Brearey et al. | 701/70 |
| 5,544,057 A * | 8/1996 | Matsuoka | 701/20 |
| 6,167,357 A * | 12/2000 | Zhu et al. | 702/175 |
| 2007/0219682 A1* | 9/2007 | Kumar et al. | 701/19 |
| 2010/0049415 A1* | 2/2010 | Bauerle | 701/78 |
| 2012/0192757 A1* | 8/2012 | Schiffers et al. | 105/1.4 |

* cited by examiner

*Primary Examiner* — John R Olszewski
*Assistant Examiner* — David Merlino
(74) *Attorney, Agent, or Firm* — Lee, Hong, Degerman, Kang & Waimey

(57) ABSTRACT

Disclosed is a load compensating device in railway vehicles, the device including a pressure sensor detecting an air spring pressure in response to loads of the vehicles, an estimation unit outputting an estimated railway vehicle load by estimating each load of a plurality of railway vehicles, and a detection unit outputting a railway vehicle load by detection of fault in the pressure sensor.

11 Claims, 3 Drawing Sheets

LOAD COMPENSATING DEVICE IN RAILWAY VEHICLES

CROSS-REFERENCE TO RELATED APPLICATION

Pursuant to 35 U.S.C. §119(a), this application claims the benefit of earlier filing date and right of priority to Korean Patent Application No. 10-2012-0038601, filed on Apr. 13, 2012, the contents of which are hereby incorporated by reference in their entirety.

BACKGROUND OF THE INVENTION

1. Field of the Invention

The present disclosure relates to a load compensating device in railway vehicles.

2. Description of Related Art

This section provides background information related to the present disclosure, which is not necessarily prior art.

Weights of each individual railway vehicle change in response to loading or unloading of passengers in railway vehicles transporting passengers, and weights of each individual railway vehicle change in response to quantity of loads in cargo railway vehicles transporting cargos. Generally, railway vehicles are equipped with a loading compensating device detecting a weight of an individual railway vehicle in response to changes in loads.

The load compensating device is equipped with an air spring and a pressure sensor measuring a pressure of the air spring, where the load compensating device detects changes in loads by detecting a pressure of the air spring changing in response to the changes in loads. The load compensating device is connected to a brake system to act as one of elements in performing a service brake and an emergency brake. That is, the air spring of the load compensating device detects pressures in response to changes in weights of passengers, and is used in calculating a consumed braking force of a service brake device to allow the railway vehicles to have a predetermined deceleration regardless of loads or weights of the passengers, or operates a load valve by being connected to an emergency brake device.

FIG. 1 is a block diagram illustrating a load compensating device according to prior art. Referring to FIG. 1, a pressure sensor 110 measures a pressure of an air spring and measures the changing loads of railway vehicles, in a case the loads of railway vehicles change in response to loading and unloading of passengers. In a case the pressure based on the changing loads of railway vehicle is received through the pressure sensor 110, a load converter 120 compares the pressure with an empty load limit and a full load limit.

In a case the pressure of the air spring is in between the empty load limit and the full load limit, the pressure is provided to a braking system for use in calculating consumed braking force of service braking device, or in realizing an emergency braking force of an emergency braking device.

The load compensating device thus explained according to prior art 100 performs an empty load warrantee and a full load warrantee in preparation for any fault in the pressure sensor 110. By way of non-limiting example, in a case the detected pressure of air spring is less than 90% of pressure of air spring during empty load, the load compensating device outputs a pressure at a rate of 90% pressure of empty load, and in a case the detected pressure of air spring is more than 120% of pressure of air spring during full load, the load compensating device outputs a pressure at a rate of 120% pressure of full load. As noted above, the load compensating device according to prior art 100 warrantees a limit value such as the empty load limit or the full load limit during fault of the pressure sensor 110.

However, the abovementioned method suffers from disadvantages in that an actual weight of railway vehicle cannot be reflected during calculation of consumed braking force in the braking device, in a case a bias error is present during occurrence of fault in the load compensating device or during measurement of a value of pressure sensor, such that same deceleration cannot be reflected on each railway vehicle to disable reflection of appropriate consumed braking force. As a result, it is difficult to perform a smooth braking operation, or a braking distance is lengthened due to failure in obtaining a necessary braking force.

SUMMARY OF THE INVENTION

This section provides a general summary of the disclosure, and is not a comprehensive disclosure of its full scope or all of its features.

Exemplary aspects of the present disclosure are to substantially solve at least the above problems and/or disadvantages and to provide at least the advantages as mentioned below. Thus, the present disclosure is directed to provide a load compensating device in railway vehicles configured to obtain an appropriate consumed braking force in response to load changes by detecting fault of the load compensating device in railway vehicles.

The present disclosure is also directed to provide a load compensating device in railway vehicles configured to supply an appropriate load value to a railway vehicle device even during occurrence of fault of the load compensating device.

Technical problems to be solved by the present disclosure are not restricted to the above-mentioned descriptions, and any other technical problems not mentioned so far will be clearly appreciated from the following description by skilled in the art.

In one general aspect of the present invention, there is provided a load compensating device in railway vehicles including a plurality of railway vehicles, the device comprising:

a pressure sensor detecting an air spring pressure in response to loads of the vehicles;

a first estimation unit outputting an estimated railway vehicle load by estimating each load of a plurality of railway vehicles using a speed of the railway vehicle, each acceleration of the plurality of railway vehicles and each traction of the plurality of railway vehicles;

a detection unit detecting a fault of the load compensating device caused by fault of the pressure sensor by receiving the air spring pressure and the estimated railway vehicle load, and outputting a railway vehicle load in response to the detection; and a first conversion unit converting the railway vehicle load received from the detection unit to a load signal.

Preferably, but not necessarily, the first estimation unit may include a modeling unit dynamically modeling the railway vehicle by receiving the speed of the railway vehicle, the each acceleration of the plurality of railway vehicles and the each traction of the plurality of railway vehicles; and a second estimation unit estimating the railway vehicle loads of the plurality of railway vehicles using the dynamic modeling modeled by the modeling unit.

Preferably, but not necessarily, the modeling unit may model in such a manner that a sum of multiplication of the masses of the plurality of railway vehicles by acceleration of each railway vehicle is a value in which traction of each railway vehicle is deducted by a gradient resistance of each railway vehicle, a running resistance of each railway vehicle and curving resistance of each railway vehicle.

Preferably, but not necessarily, the modeling unit may model the railway vehicles in such a manner that the railway vehicles run on a straight section.

Preferably, but not necessarily, the modeling unit may model the railway vehicles using friction factors and air resistance coefficient related to the running resistance as constants.

Preferably, but not necessarily, the modeling unit may model the railway vehicles, considering that each railway vehicle has a same railway gradient.

Preferably, but not necessarily, the modeling unit may define the dynamic modeling in a regression form, and the estimation unit estimates loads of the plurality of railway vehicles using a recursive least square from the regression form defined by the modeling unit.

Preferably, but not necessarily, the modeling unit may define the dynamic modeling in a regression form, and the estimation unit estimates disturbance from the regression form defined by the modeling unit, and estimates the loads of the plurality of railway vehicles using a recursive least square that compensates the disturbance.

Preferably, but not necessarily, the detection unit may include a second conversion unit measuring the pressure of the air spring and converting the pressure to a vehicle load (measured vehicle load), a generation unit generating residual value from the measured railway vehicle loads and the estimated railway vehicle loads for determining faults of the pressure sensor/load compensating device, a determination unit determining that the pressure sensor/load compensating device are faulted in a case the residual is less than a predetermined value, a selection unit selecting and outputting one of the measured railway vehicle loads and the estimated railway vehicle loads according to determination of the determination unit, and a third conversion unit outputting a pressure signal by converting the railway vehicle loads selected by the selection unit to the pressure signal.

Preferably, but not necessarily, the residual value generated by the generation unit may be an absolute value relative to a sensor fault signal of the pressure sensor and is defined by a function of the measured railway vehicle loads and the estimated railway vehicle loads.

Preferably, but not necessarily, the selection unit may select and output the estimated railway vehicle loads, in a case the determination unit determines that the pressure sensor or the load compensating device is faulty.

Preferably, but not necessarily, the selection unit may select and output the measured railway vehicle loads, in a case the determination unit determines that the pressure sensor or the load compensating device is normal.

In an advantageous effect, exemplary embodiments of the present disclosure can detect a fault of the load compensating device mounted in each railway vehicle, and phenomenon of excessive braking force or insufficient braking force can be prevented in advance by preventing an error caused by fault of the load compensating device during calculation of consumed braking force in a service brake device.

In another advantageous effect, exemplary embodiments of the present disclosure can detect an abnormal phenomenon in advance before the load compensating device is completely out of order, by detecting in real time and more accurately a fault of the load compensating device mounted on each railway vehicle.

In still another advantageous effect, exemplary embodiments of the present disclosure can output an estimated railway vehicle load instead of outputting a full load limit or an empty load limit during fault of the load compensating device, thereby allowing the railway vehicle to generate an adequate braking force, whereby an appropriate braking force is supplied to improve the ride quality felt by passengers.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION OF THE INVENTION

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of the present disclosure will be explained in detail together with the figures.

Figure 1:
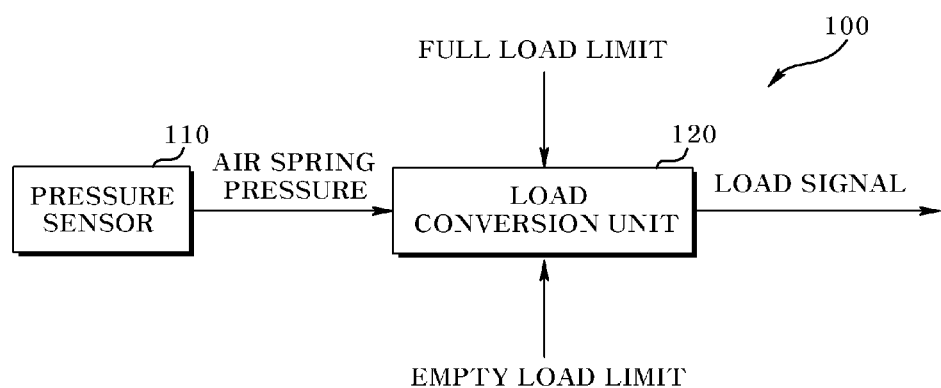
FIG. 1 is a block diagram illustrating a load compensating device according to prior art.
Figure 2:
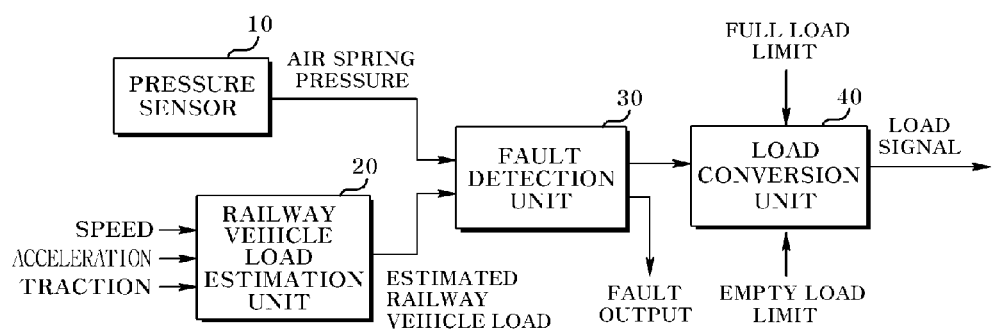
FIG. 2 is a block diagram illustrating a load compensating device in railway vehicle according to an exemplary embodiment of the present disclosure.

FIG. 2 is a block diagram illustrating a load compensating device in railway vehicle according to an exemplary embodiment of the present disclosure.

Referring to FIG. 2, the load compensating device in railway vehicle according to an exemplary embodiment of the present disclosure includes a pressure sensor 10, a railway vehicle load estimation unit 20, a fault detection unit 30 and a load conversion unit 40.

The pressure sensor 10 detects pressure of an air spring in response to a railway vehicle load. The railway vehicle load estimation unit 20 receives speed of the railway vehicle, acceleration and traction from a sensor (not shown) mounted on the railway vehicle to estimate, using the speed, the acceleration and the traction, each load of the railway vehicles including the weight of the cargo mounted on the railway vehicles or the weight of passengers currently riding the railway vehicles. The railway vehicle load estimation unit 20 uses a dynamic model of the railway vehicle for estimating the load of the railway vehicle, details of which will be explained later.

The fault detection unit 30 receives from the pressure sensor 10 the pressure of the air spring that changes in response to the load of the railway vehicle, and receives from the railway vehicle load estimation unit 20 the estimated railway vehicle load, compares therebetween and determines if there is any fault in the pressure sensor 10 and the load compensating device. Furthermore, the fault detection unit 30, after determination of fault, provides the railway vehicle load estimated by the railway vehicle load estimation unit 20 to the load conversion unit 40.

The load conversion unit 40 compares an electrical signal (i.e., a load signal) with an empty load limit and a full load limit, and transmits a value of the comparison to a brake operation system (not shown).

Now, each constituent element of the load compensating device will be described in detail.

Figure 3:
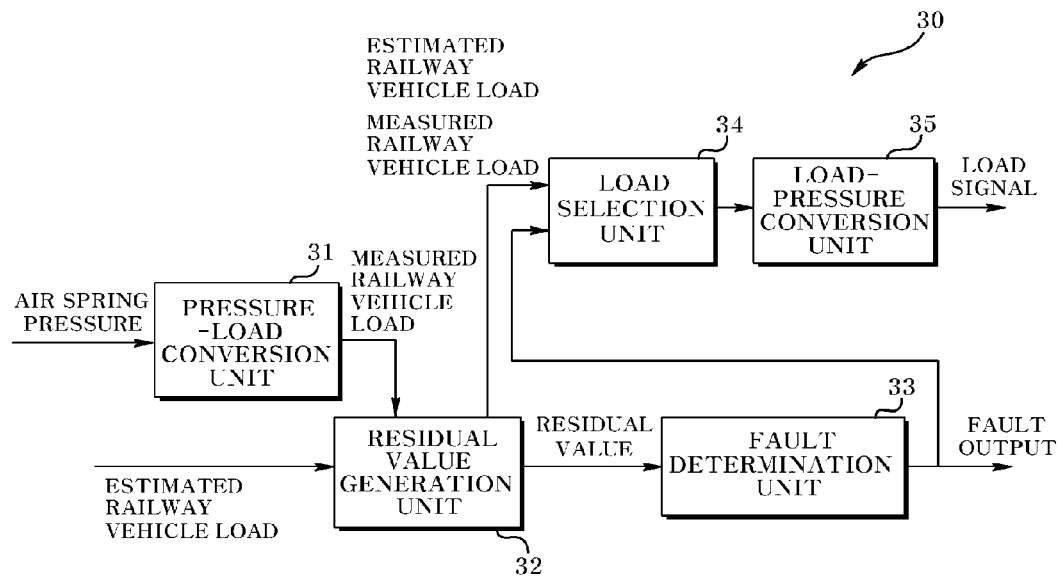
FIG. 3 is a detailed block diagram illustrating a fault detection unit of FIG. 2.

FIG. 3 is a detailed block diagram illustrating a fault detection unit of FIG. 2.

Referring to FIG. 3, the fault detection unit 30 of the load compensating device according to the present disclosure includes a pressure-load conversion unit 31, a residual value generation unit 32, a fault determination unit 33, a load selection unit 34 and a load-pressure conversion unit 35.

The pressure-load conversion unit 31 serves to convert a pressure of the air spring measured by the pressure sensor 10 to a relevant load. That is, the pressure-load conversion unit 31 outputs the measured railway vehicle load (hereinafter referred to as 'measured railway vehicle load'). The residual value generation unit 32 receives the measured railway vehicle load and the estimated railway vehicle load, compares therebetween and generates a residual value for determining whether there is a fault based on a difference therebetween. The fault determination unit 33 determines whether there is a fault on the pressure sensor 10 by receiving the residual value. The load selection unit 34 selects any one of the measured railway vehicle load and the estimated railway vehicle load based on the determination of fault determination unit 33. That is, the load selection unit 34 selects the estimated railway vehicle load, in a case the fault determination unit 33 determines that one of the pressure sensor 10 and the load compensating device is faulty, and notifies the fault to the load selection unit 34. Furthermore, the load selection unit 34 may select the measured railway vehicle load, in a case the fault determination unit 33 determines that neither the pressure sensor 10 nor the load compensating device is faulty, and notifies the determination to the load selection unit 34.

The load-pressure conversion unit 35 converts the selected railway vehicle load to a pressure-commensurate current signal and transmits the signal to a brake device.

Figure 4:
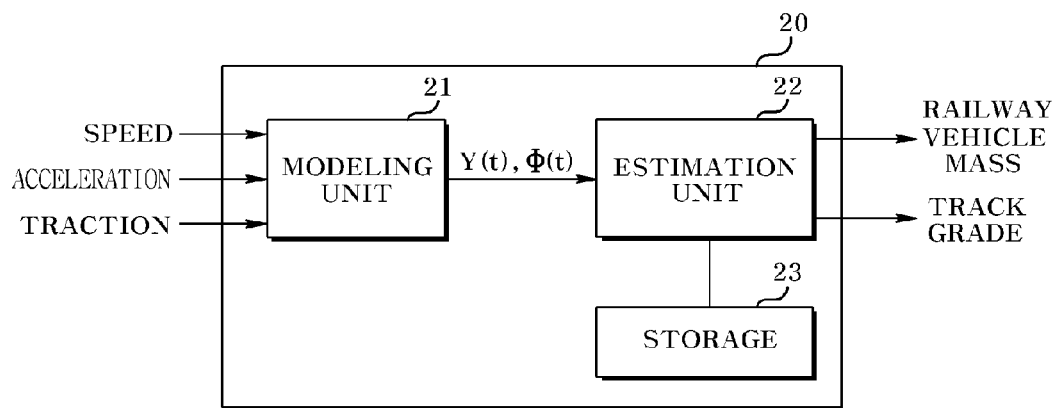
FIG. 4 is a detailed block diagram illustrating a railway vehicle load estimation unit of FIG. 2.

FIG. 4 is a detailed block diagram illustrating a railway vehicle load estimation unit of FIG. 2.

Referring to FIG. 4, the railway vehicle load estimation unit 20 includes a modeling unit 21, an estimation unit 22 and storage 23.

Figure 5:
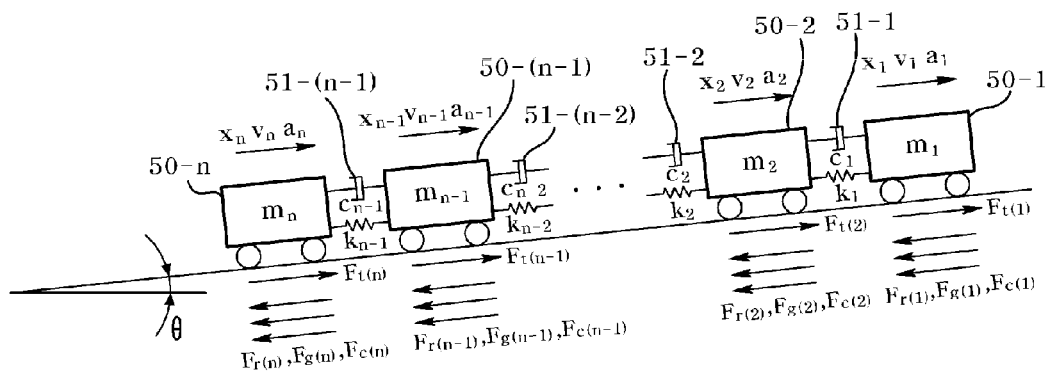
FIG. 5 is a schematic view of multiply connected railway vehicles modeled by a modeling unit of FIG. 4 according to the present disclosure.

The modeling unit 21 models a multiply-connected railway vehicle. FIG. 5 is a schematic view of multiply connected railway vehicles modeled by a modeling unit of FIG. 4 according to the present disclosure, where $m_n$ is a mass of nth railway vehicle (50-$n$), $a_n$ is acceleration of nth railway vehicle (50-$n$), $v_n$ is a speed of nth railway vehicle (50-$n$), $F_{t(n)}$ is traction or braking force of nth railway vehicle (50-$n$), $F_{r(n)}$ is a running resistance of nth railway vehicle (50-$n$), Fg (n) is a gradient resistance of nth railway vehicle (50-$n$), and $F_{c(n)}$ is a curve (or curving) resistance of nth railway vehicle.

Furthermore, $k_{n-1}$ is a spring coefficient of a coupler (51-($n$-1)) between the nth railway vehicle (50-$n$) and n-1th railway vehicle (50-($n$-1)), and $c_{n-1}$ is a damping coefficient of a coupler (51-($n$-1) between the nth railway vehicle (50-$n$) and n-1th railway vehicle (50-($n$-1)).

A dynamic modeling equation of a multiply-connected railway vehicle may be modeled relative to a first railway vehicle as in the following Equation 1, modeled relative to an ith railway vehicle as in the following Equation 2, and modeled relative to the last railway vehicle as in the following Equation 3.

$$m_a a_1 + c_1(v_1-v_2) + k_1(x_1-x_2) = F_{t(1)} - F_{r(1)} - F_{g(1)} - F_{c(1)} \quad \text{[Equation 1]}$$

$$m_i a_i + c_{i-1}(v_i-v_{i-1}) + c_i(v_i-v_{i-1}) + k_{i-1}(x_i-x_{i-1}) + k_i(x_i-x_{i-1})$$
$$= F_{t(i)} - F_{r(i)} - F_{g(i)} - F_{c(i)} \quad \text{[Equation 2]}$$

$$m_n a_n + c_{n-1}(v_n-v_{n-1}) + k_{n-1}(x_n x_{n-1}) = F_{t(n)} - F_{r(n)} - F_{g(n)} - F_{c(n)} \quad \text{[Equation 3]}$$

Referring to FIG. 5, each railway vehicle (50) is connected by a coupler (51), and each coupler (51-1~51-($n$-1)) may be modeled by a mass-less spring damper system. Furthermore, the modeling unit (21) may model the running resistance and the curve resistance in the following manner.

$$F_{r(i)} = r_0^i + r_1^i v_i + r_2^i v_i^2 \quad \text{[Equation 4]}$$

$$F_{g(i)} = m_i g \sin \theta_i \quad \text{[Equation 5]}$$

where, $r_0^i$ and $r_1^i$ are respectively constants related to resistances by friction at the ith railway vehicle, $r_2^i$ is a constant related to air resistance at the ith railway vehicle, which can be obtained by experiments. $\theta_i$ is a track grade (inclination angle) at each railway vehicle of ith railway vehicle.

In order to estimate mass and track grade of each railway vehicle, the railway vehicle load estimation unit 20 according to the present disclosure assumes the following several conditions.

First, the estimation of the estimation unit (22) is performed at an initial acceleration section after the railway vehicle starts from a railroad station. Generally, a railway vehicle mass changes only before arrival at the station and only after start from the station, such that it is rational to estimate the railway vehicle mass at the initial acceleration section after the railway vehicle leaves from the station.

Second, a mass and track grade (gradient) of each railway vehicle is estimated while the railway vehicle runs on a straight section. That is, the estimation is performed only at a section where a lateral acceleration is very small. A curve resistance of railway vehicle can be disregarded at the straight section to make a dynamic modeling of the railway vehicle simpler, whereby there is an advantage of dispensing with storage of database on curvature of track.

Third, the friction factors ($r_0^i$ and $r_1^i$) related to running resistance of railway vehicle and air resistance coefficient ($r_2^i$) are determined by experiments, and are not greatly changed such that these are assumed as constants.

Fourth, it is assumed that each railway vehicle runs on a track having a same track grade. That is, it is assumed that each railway vehicle runs on a track having a same grade. The track grade is not greatly changed at a predetermined section, such that it is rational to have this assumption.

Fifth, it is assumed that speed of each railway vehicle is substantially same. That is, a value measured by a speedometer (not shown) mounted at a front railway vehicle of a train is considered as speed of each railway vehicle. It is because each railway vehicle 50 is connected by a coupler 51 to make each railway vehicle substantially same in speed.

Based on the abovementioned assumptions, if the above Equations 1, 2 and 3 are added, terms related to spring coefficients and terms related to damping coefficients are all removed, and if Equations 4 and 5 are added by reflecting the abovementioned assumptions, the following Equation 6 may be obtained.

$$m_1 a_1 + m_2 a_2 + \Lambda + m_{n-1} a_{n-1} + m_n a_n = F_{t(1)} + F_{t(2)} + \quad \text{[Equation 6]}$$
$$\Lambda + F_{t(n-1)+} F_{t(n)} - (m_1 + m_2 + \Lambda m_{n-1} + m_n) g \sin\theta -$$
$$(r_0^1 + r_0^2 + \Lambda + r_0^{n-1} + r_0^n) - (r_1^1 + r_1^2 + \Lambda + r_1^{n-1} + r_1^n) v -$$
$$(r_2^1 + r_1^2 + \Lambda + r_1^{n-1} + r_1^n) v^2$$

where, v is a speed of an entire train received from the speedometer (not shown) mounted at a front railway vehicle, and θ is a track grade (inclination angle) on which the train is positioned.

The modeling unit 21 summarizes the mass and track grade of each railway vehicle in regression form as in the following Equations 6 and 7 in order to obtain the mass and track grade of each railway vehicle.

$$Y = \Phi^T \Theta \quad \text{[Equation 7]}$$

where, Y, $\Phi$ $\Phi$ and $\Theta$ $\Theta$ are defined as in the following Equations 8, 9 and 10.

$$Y = F_{t(1)} + F_{t(2)} + \Lambda + F_{t(n-1)} + \quad \text{[Equation 8]}$$
$$F_{t(n)} - (r_0^1 + r_0^2 + \Lambda + r_0^{n-1} + r_0^n) -$$
$$(r_1^1 + r_1^2 + \Lambda + r_1^{n-1} + r_1^n) v - (r_2^1 + r_1^2 + \Lambda + r_1^{n-1} + r_1^n) v^2$$

$$\Phi^T = [a_1 a_2 \Lambda a_{n-1} a_n g] \quad \text{[Equation 9]}$$

$$\Theta = \begin{bmatrix} m_1 \\ m_2 \\ M \\ m_{n-1} \\ m_n \\ (m_1 + m_2 + \Lambda + m_{n-1} + m_n) \sin\theta \end{bmatrix} \quad \text{[Equation 10]}$$

The traction is received from a traction device (not shown) of the train, acceleration of each railway vehicle is received from an accelerometer (not shown) provided to each railway vehicle, and speed of train is received from a speedometer (not shown) provided to a front railway vehicle of the train, where, if these pieces of data are used, only the mass and track grade of each railway vehicle remain unknown information.

The estimation unit 22 of the railway vehicle load estimation unit 20 estimates mass and track grade of each railway vehicle using models modeled by the modeling unit 21, which will described in detail with reference to the drawing.

Figure 6:
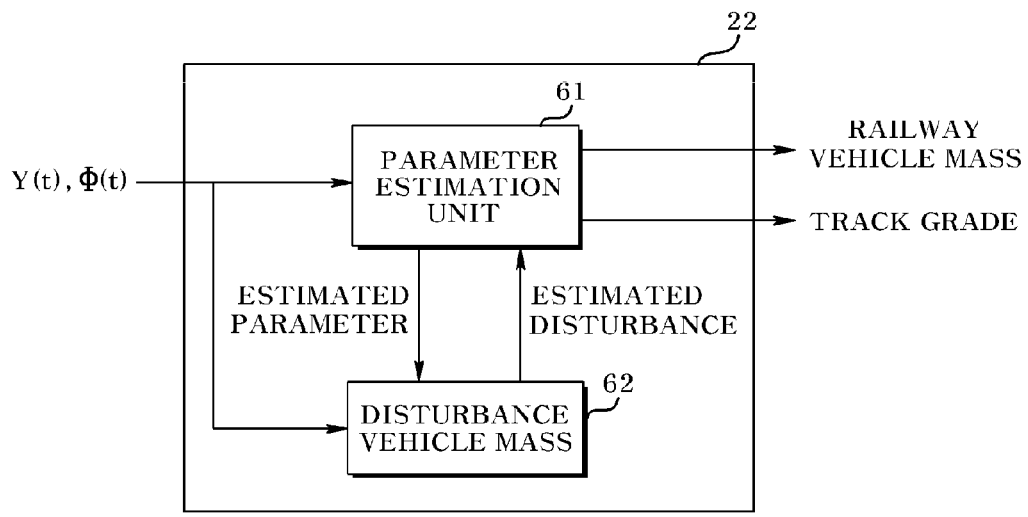
FIG. 6 is a block diagram illustrating an estimation unit of FIG. 4 according to an exemplary embodiment of the present disclosure.

FIG. 6 is a detailed block diagram illustrating an estimation unit of FIG. 4 according to an exemplary embodiment of the present disclosure, where the estimation unit 22 includes a parameter estimation unit 61 and a disturbance estimation unit 62. The estimation unit 22 may be expressed by the following Equation 11 by adding disturbance to a train model of Equation 7, which is to improve the robustness of estimation.

$$Y = \Phi^T \Theta + \eta \quad \text{[Equation 11]}$$

where, the disturbance term (η) of Equation 11 may be defined by disturbance present in the system, and include a modeling error or a sensor noise.

In the present disclosure, a disturbance estimation unit 62 is introduced to prevent degradation of estimation performance by disturbance after estimation of disturbance and to compensate the degradation of estimation performance. Furthermore, a parameter estimation unit 61 estimates parameters using Recursive Least Square, for example.

The disturbance estimation unit 62 includes a disturbance observer estimating disturbance based on dynamic model and measured value of system if disturbance is present in the system, and compensating the disturbance using an estimation value thereof, and improves robustness in parameter estimation by minimizing disturbance influence during parameter estimation by the Recursive Least Square performed by the parameter estimation unit 61 if the system is present with modeling errors or disturbance.

If disturbance is estimated by the disturbance estimation unit 62, the parameter estimation by the Recursive Least Square performed by the parameter estimation unit 61 includes Q-filer, which may be defined as below:

$$\hat{\Theta}(t) = \hat{\Theta}(t-1) + P(t)\Phi^T(t)(Y(t) - \Phi^T(t)\hat{\Theta}(t-1) - \hat{\eta}(t)) \quad \text{[Equation 12]}$$

$$P(t) = P(t-1) - p(t-1)\Phi^T(t)(1 + \Phi^T(t)P(t-1)\Phi(t))^{-1}\Phi^T(t)P(t-1) \quad \text{[Equation 13]}$$

$$\hat{\eta}(t) = Q(z)(Y(t) - \Phi^T(t)\hat{\Theta}(t-1)) \quad \text{[Equation 14]}$$

where, $\hat{\Theta}(t)$ and $\hat{\eta}(t)$ are a vector-type parameter estimated by the parameter estimation unit 61 and disturbance estimated by the disturbance estimation unit 62, which is defined by $P(t) = (\Phi^T(t)\Phi(t))^{-1}$. Furthermore, Q(z) is a Q-filter having a Low Pass Filter characteristic, and may be designed in consideration of disturbance characteristic, sampling time and the like.

That is, the vector-type parameter estimated by the parameter estimation unit 61 may be expressed as under:

$$\hat{\Theta} = \begin{bmatrix} \hat{m}_1 \\ \hat{m}_2 \\ M \\ \hat{m}_{n-1} \\ \hat{m}_n \\ (\hat{m}_1 + \hat{m}_2 + \Lambda + \hat{m}_{n-1} + \hat{m}_n) \sin\hat{\theta} \end{bmatrix} \quad \text{[Equation 15]}$$

where, $\hat{m}_1$, $\hat{m}_{2,K}$, $\hat{m}_{n-1}$, $\hat{m}_n$ are respectively estimated masses of each railway vehicle, and $\hat{\theta}$ is an estimated track grade (inclination angle). Hence, the estimated mass and estimated track grade of each railway vehicle may be calculated by the following Equations.

$$\hat{m}_i = \hat{\Theta}(i) \ (i = 1, \Lambda, n) \qquad \text{[Equation 16]}$$

$$\hat{\theta} = \sin^{-1}\left(\frac{\hat{\Theta}(n+1)}{\sum_{i=1}^{n} \hat{\Theta}(i)}\right) \qquad \text{[Equation 17]}$$

Referring to FIG. 4 again, the storage 23 stores the mass and track grade of each railway vehicle estimated by the estimation unit 22. The storage 23 may database and store the mass and track grade of each railway vehicle estimated during start from each station, where the mass and track grade of each railway vehicle at each station may be divided and stored.

Although the present disclosure has described and explained the Recursive Least Square estimating the disturbance and compensating the disturbance as an estimation method of parameters of the parameter estimation unit, the present disclosure is not limited thereto, and it is possible to estimate the parameters using the Recursive Least Square without estimation of disturbance. Furthermore, it should be apparent to the skilled in the art that parameter estimation methods other than the Recursive Least Square may be used.

The railway load (estimated railway vehicle load) estimated by the railway vehicle load estimation unit 20 is provided to the fault detection unit 30. The fault detection unit 30 receives air spring pressure from the pressure sensor 10 in addition to the estimated railway vehicle load.

Now, operation of the fault detection unit 30 will be described in detail with reference to FIG. 3.

The pressure-load conversion unit 31 converts the air spring pressure detected by the pressure sensor 10 to a relevant load (measured railway vehicle load).

The residual value generation unit 32 receives the railway vehicle load estimated by the railway vehicle load estimation unit 20 and the measured railway vehicle load converted by the pressure-load conversion unit 31, where the fault of the pressure sensor 10 for fault detection of the load compensating device at each railway vehicle is defined by the following Equation 18 as functions of the measured railway vehicle load and estimated railway vehicle load.

$$m_i^s = (1+f_i) + \hat{m}_i \qquad \text{[Equation 18]}$$

where, i is any number from 1 to n, $m_i^s$ is a measured railway vehicle load of ith railway vehicle, and $\hat{m}_i$ is an estimated railway vehicle load of the ith railway vehicle. $f_i$ is a sensor fault signal for detecting the load fault at the ith railway vehicle. Thus, residual value generation unit 32 may calculate the residual value for determining the fault of the sensor in the following manner:

$$r_i = |f_i| = |1 - m_i^s/\hat{m}_i| \qquad \text{[Equation 19]}$$

where, $r_i$ is a residual value for fault detection of the load compensating device of ith railway vehicle, and may be defined by an absolute value to the sensor fault signal. As in the Equation 19, the residual value is determined by a ratio between the estimated load and railway vehicle load. That is, the fault of the pressure sensor may be determined based on the residual value expressed by functions of estimated railway vehicle load and the measured railway vehicle load. The fault determination unit 33 performs the fault determination of the pressure sensor 10 using the residual value thus defined.

That is, the fault determination unit 33 determines that the pressure sensor 10 is normal if the residual value generated by the residual generation unit 32 is less than a predetermined threshold, and determines that the pressure sensor 10 is faulty if the residual value generated by the residual generation unit 32 is higher than a predetermined threshold.

That is, the fault determination unit 33 determines that the pressure sensor 10 (load compensating device) is normal if $r_i < \delta$, and determines that the pressure sensor 10 is faulty if $r_i \geq \delta$. At this time, $\delta$ is a threshold predetermined by a user for determining the fault, and may be determined in advance by convergence bound of estimated railway vehicle load of the railway vehicle load estimation unit 20, characteristic of sensor signal of the load compensating device and characteristic of the railway vehicle.

The load selection unit 34 selects and outputs any one of the measured railway vehicle load and the estimated railway vehicle load in response to determination by the fault determination unit 33 on whether the pressure sensor 10 is normal or abnormal. Although the conventional load compensating device has solved the fault of the pressure sensor by methods of guaranteeing the empty load limit and the full load limit, the conventional methods have suffered from a problem of degrading the brake performance because the brake device is supplied with a value different from the actual railway vehicle load. Another problem is that even if the measured value by the pressure sensor is in between the empty load limit and the full load limit, a bias error that may be generated during measurement may be outputted in a load different from an actual load, resulting in degradation in performance.

Thus, the load compensating device according to the present disclosure selects and outputs any one of the measured railway vehicle load and the estimated railway vehicle load based on the determination by the fault determination unit 33.

To be more specific, in a case the fault determination unit 33 determines that there is no fault on the pressure sensor 10, the load selection unit 34 selects and outputs the measured railway vehicle load, and in a case the fault determination unit 33 determines that there is a fault on the pressure sensor 10, the load selection unit 34 selects and outputs the estimated railway vehicle load.

Furthermore, the fault determination unit 33 notifies the load selection unit 34 that there is generated a fault on the pressure sensor, and at the same time, notifies the user that there is generated a fault on the load compensating device. To this end, a display unit (not shown) may be further included.

Alternatively, the fault determination unit 33 may transmit a signal to a server through network that there is generated a fault. The detailed description thereof is well known to the skilled in the art such that no further elaboration will be made.

The load-pressure conversion unit 35 converts the railway vehicle load selected by the load selection unit 34 to a pressure signal and outputs the signal to the brake operation system as explained before.

The exemplary embodiments of the present disclosure relate to fault detection of load compensating device measuring a railway vehicle load in response to the pressure change in air spring that changes in response to railway vehicle load. The load compensating device according to the exemplary embodiments of the present disclosure detects the fault using the railway vehicle load estimated by the measured railway vehicle load and the dynamic model of the railway vehicle.

In an advantageous effect, exemplary embodiments of the present disclosure can detect a fault of the load compensating device mounted in each railway vehicle, and phenomenon of excessive braking force or insufficient braking force can be prevented in advance by preventing an error caused by fault of the load compensating device during calculation of consumed braking force in a service brake device.

In another advantageous effect, exemplary embodiments of the present disclosure can detect an abnormal phenomenon in advance before the load compensating device is completely out of order, by detecting in real time and more accurately a fault of the load compensating device mounted on each railway vehicle.

In still another advantageous effect, exemplary embodiments of the present disclosure can output an estimated railway vehicle load instead of outputting a full load limit or an empty load limit during fault of the load compensating device, thereby allowing the railway vehicle to generate an adequate braking force, whereby an appropriate braking force is supplied to improve the ride quality felt by passengers.

The above-mentioned load compensating device in railway vehicles according to the exemplary embodiment of the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A load compensating device in a railway vehicle, the railway vehicle including a plurality of railway sub-vehicles, the device comprising:
    a pressure sensor configured to detect an air spring pressure in response to loads of the railway sub-vehicles;
    a first estimation unit configured to output an estimated railway vehicle load by estimating each load of the plurality of railway sub-vehicles using a speed of the railway vehicle, an acceleration of each of the plurality of railway sub-vehicles, and a traction of each of the plurality of railway sub-vehicles;
    a detection unit configured to detect a fault of the load compensating device caused by fault of the pressure sensor by receiving the air spring pressure and the estimated railway vehicle load, and outputting a railway vehicle load; and
    a first conversion unit configured to convert the railway vehicle load received from the detection unit to a load signal wherein the detection unit comprises:
        a second conversion unit configured to measure a pressure of an air spring and convert the pressure to a measured vehicle load,
        a generation unit configured to generate a residual value from the measured vehicle load and the estimated railway vehicle load,
        a determination unit configured to determine whether the pressure sensor or load compensating device includes a fault if the residual value is less than a predetermined value,
        a selection unit configured to select and output one of the measured railway vehicle load and the estimated railway vehicle load according to a determination of the determination unit, and
        a third conversion unit configured to convert the railway vehicle load selected by the selection unit to a pressure signal and output the pressure signal.

2. The device of claim 1, wherein the first estimation unit includes:
    a modeling unit configured to dynamically model the railway vehicle by receiving the speed of the railway vehicle, the acceleration of each of the plurality of railway sub-vehicles, and the traction of each of the plurality of railway sub-vehicles, and
    a second estimation unit configured to estimate the load of each of the plurality of railway sub-vehicles using the dynamic modeling modeled by the modeling unit.

3. The device of claim 2, wherein the modeling unit is further configured to utilize an equation wherein a sum of the products of a mass of each of the plurality of railway sub-vehicles and the acceleration of each railway vehicle is equal to the traction of each railway sub-vehicle deducted by a gradient resistance of each railway sub-vehicle; a running resistance of each railway sub-vehicle; and a curving resistance of each railway sub-vehicle.

4. The device of claim 3, wherein the modeling unit is further configured to model the railway vehicle such that the railway vehicle runs on a straight section.

5. The device of claim 3, wherein the modeling unit is further configured to model the railway vehicle using constants for friction factors and an air resistance coefficient related to the running resistance.

6. The device of claim 3, wherein the modeling unit is further configured to model the railway sub-vehicles using a same railway gradient for each railway sub-vehicle.

7. The device of claim 3, wherein the modeling unit is further configured to define the dynamic modeling in a regression form, and the second estimation unit is further configured to estimate the load of each of the plurality of railway sub-vehicles using a recursive least square from the regression form defined by the modeling unit.

8. The device of claim 2, wherein the modeling unit is further configured to define the dynamic modeling in a regression form, and the estimation unit is further configured to estimate disturbance from the regression form defined by the modeling unit and the load of each of the plurality of railway sub-vehicles using a recursive least square that compensates the disturbance.

9. The device of claim 1, wherein the residual value generated by the generation unit is an absolute value relative to a sensor fault signal of the pressure sensor and is defined by a function of the measured railway vehicle load and the estimated railway vehicle load.

10. The device of claim 1, wherein the selection unit is further configured to select and output the estimated railway vehicle load when the determination unit determines that the pressure sensor or the load compensating device is faulty.

11. The device of claim 1, wherein the selection unit is further configured to select and output the measured railway vehicle load when the determination unit determines that the pressure sensor or the load compensating device is normal.

* * * * *